(12) United States Patent
Accisano et al.

(10) Patent No.: US 11,836,434 B2
(45) Date of Patent: Dec. 5, 2023

(54) AUTOPLACEMENT OF SUPERCONDUCTING DEVICES

(71) Applicant: Microsoft Technology Licensing, LLC, Redmond, WA (US)

(72) Inventors: Paul Accisano, Seattle, WA (US); Srinivas Raghu Gatta, Redmond, WA (US); Kenneth Reneris, Kirkland, WA (US); Michael Goulding, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/235,772

(22) Filed: Apr. 20, 2021

(65) Prior Publication Data

US 2022/0335198 A1 Oct. 20, 2022

(51) Int. Cl.
*G06F 30/30* (2020.01)
*G06F 30/398* (2020.01)
(Continued)

(52) U.S. Cl.
CPC .......... *G06F 30/398* (2020.01); *G06F 30/373* (2020.01); *G06F 30/392* (2020.01);
(Continued)

(58) Field of Classification Search
CPC .... G06F 30/398; G06F 30/373; G06F 30/392; G06F 30/3953; G06F 2119/18;
(Continued)

(56) References Cited

U.S. PATENT DOCUMENTS

2004/0232912 A1* 11/2004 Tsukamoto .......... G01R 33/025
600/409
2015/0236235 A1* 8/2015 Ladizinsky ........... H01L 39/223
427/63

(Continued)

OTHER PUBLICATIONS

Fourie, et al., "ColdFlux Superconducting EDA and TCAD Tools Project: Overview and Progress", In Journal of IEEE Transactions on Applied Superconductivity vol. 29, Issue 5, Aug. 1, 2019, 7 Pages.

(Continued)

*Primary Examiner* — Jack Chiang
*Assistant Examiner* — Brandon Bowers
(74) *Attorney, Agent, or Firm* — Fountainhead Law Group PC

(57) ABSTRACT

A system and method for the automatic placement of superconducting devices determines an arrangement of a series of Josephson junctions between a start point and an end point of an inductive wiring run on a superconducting circuit layout having a plurality of discrete Josephson junction placement sites by determining costs of placing each Josephson junction of the series of Josephson junctions at the plurality of discrete Josephson junction placement sites between the start point and the end point of the inductive wiring run based at least on a comparison of a target inductance value to inductances of wires connecting to the Josephson junction and selecting sites from the plurality of discrete Josephson junction placement sites to place each Josephson junction corresponding to the arrangement of the series of Josephson junctions with the least determined cost for the inductive wiring run.

20 Claims, 9 Drawing Sheets

(51) Int. Cl.
| | |
|---|---|
| *G06F 30/373* | (2020.01) |
| *G06F 30/392* | (2020.01) |
| *G06F 30/3953* | (2020.01) |
| *H10N 60/01* | (2023.01) |
| *H10N 60/12* | (2023.01) |
| *H10N 60/82* | (2023.01) |
| *H10N 60/80* | (2023.01) |
| *G06F 119/18* | (2020.01) |

(52) U.S. Cl.
CPC ..... *G06F 30/3953* (2020.01); *H10N 60/0912* (2023.02); *G06F 2119/18* (2020.01); *H10N 60/12* (2023.02); *H10N 60/805* (2023.02); *H10N 60/82* (2023.02)

(58) Field of Classification Search
CPC ... H01L 39/2493; H01L 39/025; H01L 39/06; H01L 39/223
USPC ........................................................ 716/122
See application file for complete search history.

(56) References Cited

U.S. PATENT DOCUMENTS

| | | | | |
|---|---|---|---|---|
| 2016/0034609 | A1* | 2/2016 | Herr | ................... G06F 30/327 716/104 |
| 2022/0343052 | A1 | 10/2022 | Goulding et al. | |

OTHER PUBLICATIONS

Jabbari, et al., "Global Interconnects in VLSI Complexity Single Flux Quantum Systems", In Proceedings of the Workshop on System-Level Interconnect: Problems and Pathfinding Workshop, Nov. 5, 2020, 7 Pages.
Nath, et al., "An Automatic Placement and Routing Methodology for Asynchronous SFQ Circuit Design", In Journal of IEEE Transactions on Applied Superconductivity, vol. 30, Issue 3, Apr. 2020, 10 Pages.
"International Search Report and Written Opinion issued in PCT Application No. PCT/US22/023179", dated Jul. 20, 2022, 12 Pages.
"Non Final Office Action Issued in U.S. Appl. No. 17/242,193", dated Nov. 18, 2022, 7 Pages.
Lin, et al., "Postrouting Optimization of the Working Clock Frequency of Single-Flux-Quantum Circuits", In the Journal of IEEE Transaction On Applied Superconductivity, vol. 30, Issue 7, Oct. 1, 2020, 14 pages.
Lin, et al., "qGDR: A Via-Minimization-Oriented Routing Tool for Large-Scale Superconductive Single-Flux-Quantrum Circits", In the Journal of IEEE Transactions On Applied Superconductivity, vol. 29, Issue 7, Oct. 1, 2019, 12 Pages.
"International Search Report and Written Opinion Issued in PCT Application No. PCT/US22/023225", dated Jul. 21, 2022, 14 Pages.
Tanka, et al., "Automated Passive-Transmission-Line Routing Tool for Single-Flux-Quantum Circuits Based on A* Algorithm", In the Journal of IEICE Transactions On Electronics, Institute Of Electronics, vol. E93C, Issue 4, Apr. 1, 2010, pp. 435-439.
"Notice of Allowance Issued in U.S. Appl. No. 17/242,193", dated Apr. 17, 2023, 5 pages.

* cited by examiner

AUTOPLACEMENT OF SUPERCONDUCTING DEVICES

BACKGROUND

The present disclosure relates to computing, and more particularly, to the automatic placement of superconducting devices.

Superconducting digital logic circuits are made up of active Josephson junctions (JJ) and passive elements such as inductors, resistors, transformers, and transmission lines. Josephson junctions are superconducting devices consisting of two or more superconductors coupled by a weak link, across which current flows continuously without any voltage applied. This is a phenomenon of supercurrent known as the Josephson effect. The weak link can consist of a thin insulating barrier, a short section of non-superconducting metal, or a physical constriction that weakens the superconductivity at the point of contact.

The primary advantage of superconducting circuits is improved power efficiency over conventional complementary metal-oxide-semiconductor (CMOS) technology. Much of the power consumed, and heat dissipated, by conventional processors comes from moving information between logic elements rather than the actual logic operations. Since superconductors have zero electrical resistance, little energy is required to move bits within the processor.

Electronic design automation (EDA) is a category of software tools for designing electronic systems such as integrated circuits and printed circuit boards. The tools work together so that chip designers can design and analyze complex interactions between billions of components, making EDA tools important for their design.

Various embodiments, examples, and advantages are described in the detailed description below.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

One of the key challenges of timing superconducting circuits is the limited number of Josephson Junctions (JJ) placement sites. Since additional JJs (e.g., in the form of Josephson Transmission Lines, or JTLs, which are pairs of JJs) must be added to component connections in order to delay a signal, this can lead to JJ site starvation in congested areas of the circuit layout. Furthermore, the distance between JJs is limited by the available inductance of the wire between them. Unlike conventional CMOS designs, which allow wires to go anywhere on a chip and be of any length necessary to meet distance and timing requirements, delaying a signal in a superconducting circuit requires the use of JJs proportional to the delay, all of which are constrained to a limited, discrete grid. In a superconducting circuit design, a single JTL is able to cover a certain amount of distance while introducing a certain amount of delay. Therefore, there is an ideal number of JTLs for an inductive wiring run with a given signal delay and distance requirement.

The closest analog in conventional CMOS design is using inverter chains to meet hold violations. However, there are two factors that CMOS does not have to deal with. First, CMOS circuits typically do not have to be delayed as much as superconducting circuits, so the number of inverters to place is much smaller than the number of JJs. Second, in superconducting circuits, the maximum wire length between JJs is relatively short compared to wire lengths used in CMOS circuits. This requires successive JJs to be close to one another, which is a type of problem that does not exist in CMOS circuits.

Features and advantages of the present disclosure include an automated algorithm for efficiently placing JJs at the limited placement sites and avoiding the problems caused by high JJ congestion. Without these techniques, placing JJs becomes extremely time consuming, as standard searching algorithms would have to try to find a way to rearrange the placed JJs in highly packed areas. Furthermore, even if successful, the wiring step would become more time-consuming as well, as the increased JJ density leads to more difficult wire routing. With this technique, the JJ density may, for example, be kept at reasonable levels.

Figure 1:
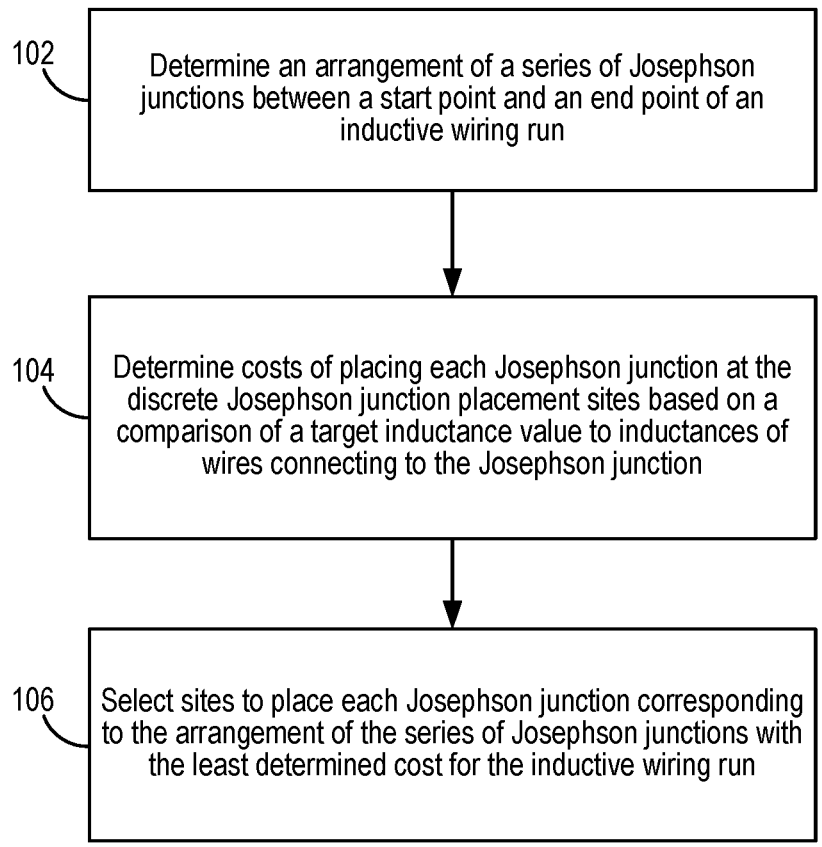
FIG. 1 illustrates a method of Josephson junction arrangement on a superconducting circuit layout according to an embodiment.

FIG. 1 illustrates a method of Josephson junction arrangement on a superconducting circuit layout. In this example, at 102, one or more processors determine an arrangement of a series of Josephson junctions between a start point and an end point of an inductive wiring run on a superconducting circuit layout having a number of discrete Josephson junction placement sites. For example, as illustrated in examples below, in order for the inductive wiring run to span the distance between the start point (e.g., a root input pin) and the end point (e.g., a root output pin), a number of Josephson junctions are selectively placed on the superconducting circuit layout such that the inductive wiring run can reach from the start point to each junction in succession before arriving at the end point.

At 104, the processors determine costs of placing each Josephson junction at the placement sites between the start point and the end point of the inductive wiring run. In some embodiments, the costs of placing each Josephson junction are based at least on a comparison of a target inductance value to inductances of wires connecting to the Josephson junction. For example, as illustrated in examples below, the placement sites can be represented as nodes in a graph and a cost function is used to determine edge costs between the nodes. Since the length of wires in a superconducting circuit are limited due to their inductance, placement sites which would result in a wire length beyond an inductance threshold cannot be reached without an intervening Josephson junction. Placement sites that would result in wire inductance values near the inductance threshold may be assigned higher costs the closer they are to the threshold due to the difficulty of moving a Josephson junction at that site without exceeding the inductance threshold.

At 106, the processors select sites from the discrete Josephson junction placement sites to place each Josephson junction corresponding to the arrangement of the series of Josephson junctions with the least determined cost for the inductive wiring run. For example, as illustrated in examples below, the graph search algorithm finds a lowest cost route through the graph representation of the placement sites, and placement of the Josephson junctions is determined based on that route.

Figure 2:
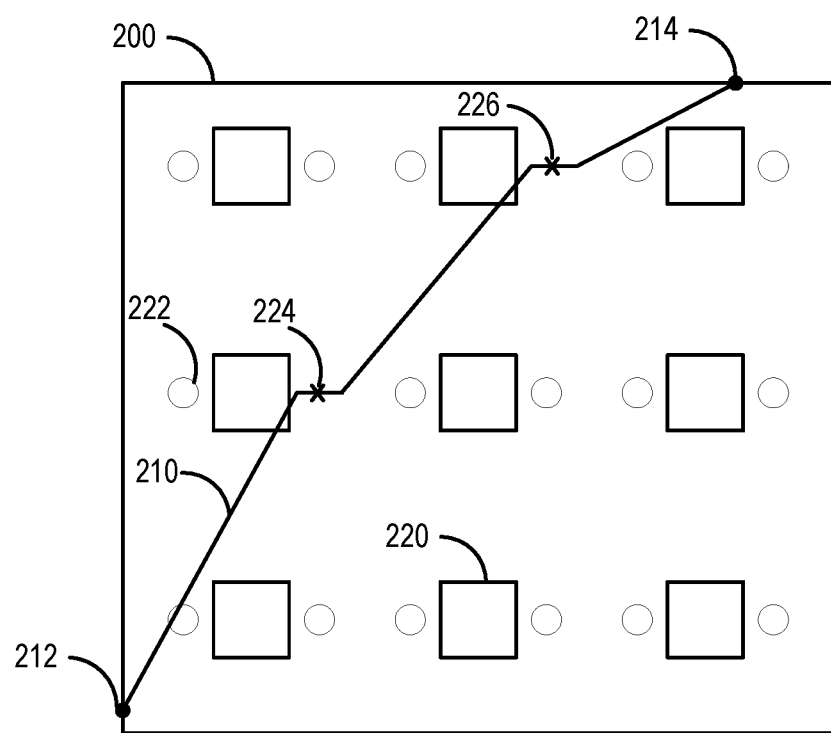
FIG. 2 illustrates a superconducting circuit layout including an inductive wiring run and Josephson junctions placed according to an embodiment.

FIG. 2 illustrates a superconducting circuit layout 200 including an inductive wiring run 210 with a series of Josephson junctions 224, 226 (shown using an 'X' with a line through it, which is the electrical symbol for a Josephson junction) placed at discrete Josephson junction placement sites 222. On the superconducting circuit layout 200, each of the discrete Josephson junction placement sites 222 are arranged in a two-dimensional array. This array can span the length and width of the superconducting circuit layout 200 with Josephson junction placement sites 222 spaced at regular intervals between them wherever space is not occupied by logic chips or other components (not illustrated). In this example, the Josephson junction placement sites 222 may be guarded by a moat 220 to avoid flux trapping close to or inside the Josephson junctions. A number of Josephson junction placement sites 222 may be placed around each moat 220, such as the two sites around each as illustrated. As a result, there are a limited number of available Josephson junction placement sites 222, which must be shared among the inductive wiring runs on the superconducting circuit layout 200.

In the example illustrated, the inductive wiring run 210 connects a root input pin 212 on the lower-left of the superconducting circuit layout 200 to a route output pin 214 located to the upper-right. In this simplified example showing a single inductive wiring run 210, the root input pin 212 represents the start point, and the root output pin 214 represents the end point for the wiring run. In other examples, the start point and/or the end point for an inductive writing run 210 may be an input or output of a logic gate or a splitter Josephson junction. In more complex examples, multiple runs would be present on the superconducting circuit layout 200, and Josephson junction sites would be chosen to accommodate each of the runs.

When placing each run, a number of Josephson junctions 224, 226 are placed at the placement sites 222 in order to meet a distance requirement of the inductive wiring run 210 and inductance target of each wire segment. For example, the distances of each of three wire segments of the inductive wiring run 210 (e.g., between the root input pin 212 and the first Josephson junction 224, between the first Josephson junction 224 and the second Josephson junction 226, and between the second Josephson junction 226 and the root output pin 214) are limited by the inductance target of the wire. In some embodiments, the wiring run inductance cannot be below a minimum threshold value or above a maximum threshold value. Therefore, in order to traverse greater distances, an inductive wiring run 210 requires additional Josephson junctions to be placed on the grid with limited available placement sites 222.

Figure 3:
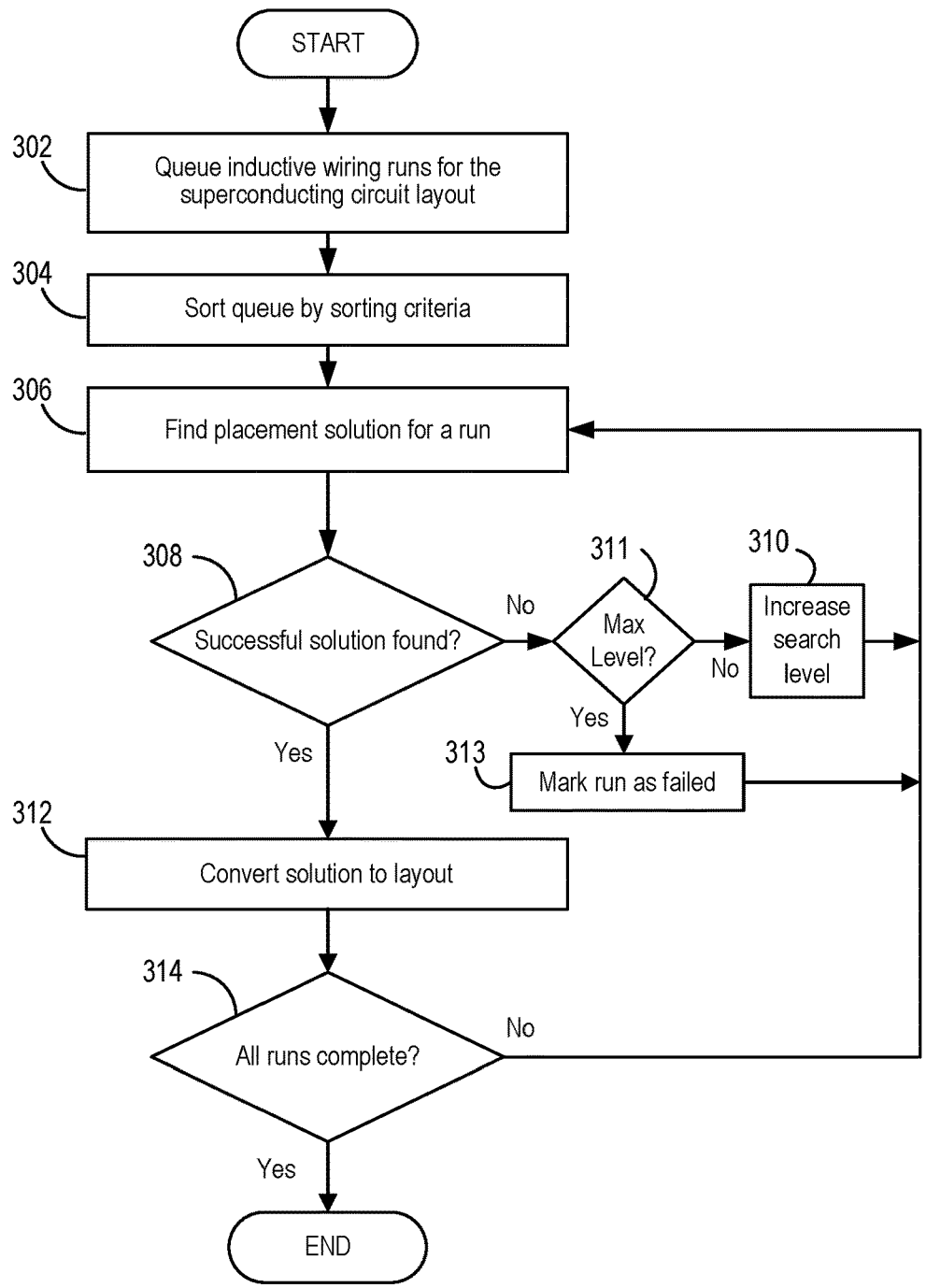
FIG. 3 illustrates a method of placing Josephson junctions for inductive wiring runs according to an embodiment.

FIG. 3 illustrates a method of placing Josephson junctions for inductive wiring runs according to an embodiment. At 302, one or more processors queue data representing a plurality of inductive wiring runs for the superconducting circuit layout. In some embodiments, the queue of inductive wiring runs is predetermined and sent to the processors along with data describing aspects of the inductive wiring runs. The data may include the start point and the end point of each run as well as a predetermined number of Josephson junctions for the run. The data may also include a number of options for placement sites for each of the Josephson junctions for each run.

At 304, the processors may sort the queue using one or more sorting criteria. Sorting criteria may include, for example, the number of Josephson junctions in each wiring run or the number of options for placement sites (e.g., number of sites each Josephson junction can be placed at for each run while maintaining inductance within a predefined range). Accordingly, short runs with few placement options may be placed first. In some embodiments, the processors sort the queue based on wiring run length to place Josephson junctions for short inductive wiring runs with few options (e.g., shorter than a threshold number of junctions, fewer than a threshold number of placement site options) at the head of the queue. This allows more constrained runs to reserve important placement sites before later runs take them because later (longer) runs may have more placement options. Inductive wiring runs that do not meet the threshold values for short runs with few options can then be sorted in descending order of junction count, for example, which has the advantage of maximizing the probability of successfully placing the queue of runs efficiently.

At 306, the processors search for a placement solution for the inductive wiring runs in the queue based on the sort order. In some embodiments, site locations are represented as nodes of a graph and a graph search algorithm searches the graph to find a placement solution (e.g., graph nodes each representing placement sites to be used between the start and end node). In one embodiment, the processors may use the A* (A-Star) Search algorithm to find the placement solution, where Josephson junction-placement site pairs (e.g., JJ, site locations) are graph nodes and A* search finds a minimum cost path through the graph, for example.

At 308, the processors determine whether a successful placement solution was found. If no placement solution was found, the processors can increase a search level at 310. At each successive search level, alternative algorithms which may have more resource-intensive strategies may be employed to find a successful placement solution.

In some embodiments, the processors can utilize one or more optimizations to more efficiently find a placement solution for a run. In one optimization, when creating the graph node representation for the graph search algorithm for a given run, the processor can split nodes corresponding to placement sites reserved by previous runs into two parts with a relatively high-cost edge between them. For example, the processor can insert an extra node between a node representing a first placement site and a node representing a second placement site corresponding to a site reserved by a previous run.

In another optimization, the system can cache and reuse information calculated between runs. For example, for each Josephson junction in a run, the system can store, and later reference, a set of sites determined to be feasible. In another optimization, when computing run sort order for the queue of runs, the system can check the number of free sites available for the first and last Josephson junction of a run. If there are no free sites for either junction, then the system can move a junction from another run at this time preemptively.

In another optimization, the system can determine that a run requires more Josephson transmission lines for timing purposes than required to meet a distance requirement. In this case, the system can use a simplified algorithm that does not have an endpoint and routes the run in the direction of least junction density until the timing threshold has been reached. For example, the design may be subdivided into quadrants, and the system identifies the quadrant with the fewest number of placed Josephson junctions. This quadrant may be further subdivided until a sufficiently small target area (e.g., within a predefined size threshold) is identified. The simplified algorithm may then perform routing to the target area. While routing, the algorithm may prioritize sites which have few placed Josephson junctions immediately around them. Once enough Josephson junctions have been used such that the number of remaining Josephson junctions is within a threshold tolerance based on the distance remaining to be traversed to the true target, the system can revert to the standard routing algorithm. If the low-density target area is reached before this occurs, the system may find a new lowest-density area and repeat the algorithm.

Once a placement solution for a given run is found, at 308, the graph nodes for the wire run are converted to actual placements of Josephson junctions in a layout at 312. Next, the processors check whether there are any inductive wiring runs remaining in the queue to be placed on the superconducting circuit layout at 314. If the queue of runs is empty, the process ends. If there are remaining runs in the queue, the method returns to 306 to find a placement solution for the next run in the queue. On the other hand, if the algorithm increases to a maximum search level and still fails at 311, the wiring run is marked as failed at 313 and the process moves to 306, for example.

Figure 4:
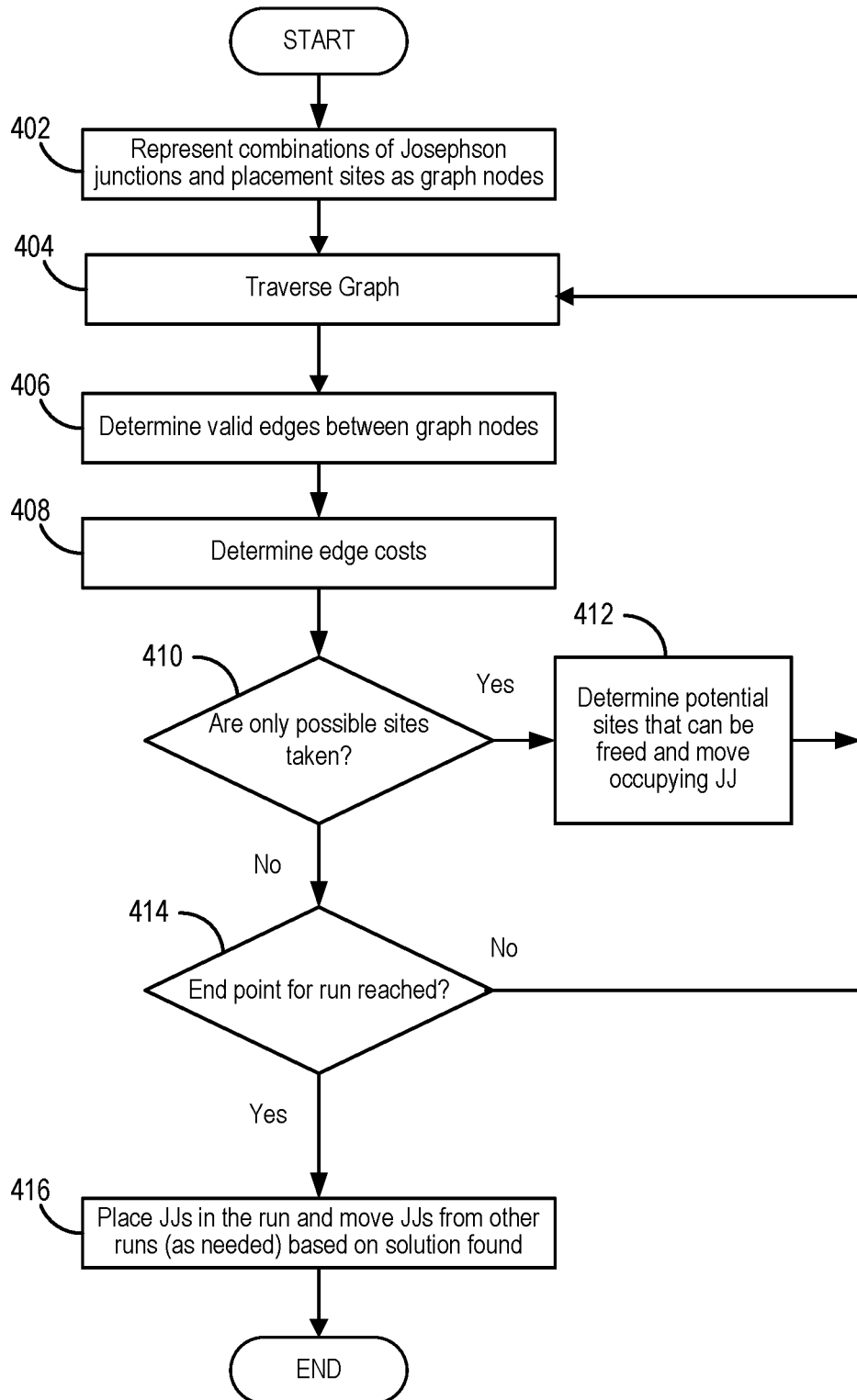
FIG. 4 illustrates a method of determining an arrangement of a series of Josephson junctions between a start point and an end point of an inductive wiring run according to an embodiment.

FIG. 4 illustrates a method of determining an arrangement of a series of Josephson junctions between a start point and an end point of an inductive wiring run. In some embodiments, at 402, one or more processors represent combinations of Josephson junctions and placement sites on a superconducting circuit layout as graph nodes. In this format, the processors can use a graph search algorithm, such as A* (A-Star) Search to efficiently find a minimum cost path through the graph.

A* is a nearest neighbor, lowest cost, graph search algorithm. For example, A* may be described as an informed search algorithm, or a best-first search, meaning that it is formulated in terms of weighted graphs. Starting from a specific starting node of a graph, A* aims to find a path to the goal node having the smallest cost (least distance travelled, shortest time, etc.). It does this by maintaining a tree of paths originating at the start node and extending those paths one edge at a time until its termination criterion is satisfied. At each iteration of a main loop, A* determines which of its paths to extend. It does so based on the cost of the path and an estimate of the cost required to extend the path all the way to the goal.

At 404, the search algorithm traverses the graph. In particular, the algorithm may advance to a graph node with lowest estimated remaining cost. The algorithm may select an edge between the start node and various candidate nodes in the graph and select nodes as described below until a path is found.

At 406, the processors determine valid edges between the graph nodes according to the graph search algorithm. In one embodiment, an edge connects two nodes A and B if certain conditions are met. For example, such conditions may comprise:

1. B's site is free or can be freed;
2. the min-cost path found from the start point to A does not include a node with the same site as B (e.g., no loops);
3. the inductor between A's JJ and B's JJ can reach from A's site to B's site (e.g., distance between A and B is less than the maximum inductance, and if the distance between A and B corresponds to an inductance below the minimum inductance additional wire run length may be used between A and B—aka, wire run meandering); and
4. there is still a path from B's site to the end point using all the remaining inductors after B's JJ (e.g., the algorithm can still reach the end with the remaining wires in the run without exceeding the target inductance range of each). In one embodiment, the algorithm may determine reachability by advancing toward the end point in successive steps between available placement sites as far as possible without exceeding the maximum inductance and determining if the end point can still be reached (e.g., from a candidate edge between nodes A and B). The reachability algorithm may also be referred to as a "run length checker," for example. In one embodiment, this reachability may be determined using a fast, greedy algorithm. In general, the greedy algorithm follows a problem-solving heuristic of making the locally optimal choice at each step. For example, at each step, the greedy algorithm selects the Josephson junction placement site which is closest to the end point and reachable from the previous placement site based on the inductance constraints of the wire. This may not produce an optimal solution, but nonetheless, a greedy heuristic may yield locally optimal solutions that approximates a globally optimal solution in a reasonable amount of time. In some examples, the reachability algorithm can use fewer JJs than have been allocated for the run. The reachability algorithm may further assume that each of the placement sites is available. The reachability algorithm can also determine and log the percentage of inductance used for each wire at each step. The reachability algorithm may be performed as a subprocess of the A* search algorithm, for example, to determine if a solution from the start to end exists for a given pair of nodes A and B.

At 408, edge costs are determined for at least some of the graph nodes according to the graph search algorithm. In some embodiments, the edge costs between the graph nodes are determined based on a deviation of the inductance of the inductive wiring run from a target inductance for the inductive wiring run. For example, in one embodiment, edges with inductances having a percentage (e.g., 80%) of a target inductance have a higher weight and lower cost. In one embodiment, the algorithm may receive an ideal inductance and a tolerance from which a maximum inductance and a minimum inductance may be calculated, and the target inductance is set to a percentage (e.g., 80%) of the ideal inductance, for example. In some embodiments, the edge costs between the graph nodes can be weighted by whether the placement site corresponding to the graph node is already reserved by a previously placed inductive wiring run. For example, reserved placement sites can be assigned a higher cost to reduce the likelihood of that site being chosen for the current run and causing a site free-up to take place.

In some situations, at 410, the graph search process may determine that the only possible sites for the next Josephson junction needed for the inductive wiring run are reserved by Josephson junctions placed for previous runs. For example, the processors may determine that the only unused Josephson junction placement sites fail to satisfy a predefined minimum inductance and a predefined maximum inductance of the inductive wiring run. Upon determining this, at 412, the algorithm can determine potential sites that can be freed, and free up a site by assigning a previously-placed Josephson junction from a previous inductive wiring run to an alternate placement site for that run in order to accommodate both the present inductive wiring run and the previous inductive wiring run. For example, JJs may not be moved during the graph traversal. The traversal may determine which JJs can be moved, and where to move them, and the JJs are moved after a solution has been found and the solution is being converted to an actual layout, for example. For instance, if the graph search determines that there are only two possible sites, and both are taken. The algorithm may only need to free up one of the two sites, but it won't know which one until after the graph search has completed and determined which of the two sites would provide the lowest cost path. Furthermore, moving and placing JJs changes the graph, and changing the graph while it is being traversed can lead to inconsistent results. While the graph is being traversed, it may be set to read-only, for example, and thus no place or move operations are performed until after the traversal is complete.

At 414, the process may return to the traversal step 404 until the processors determine that the end point for the run has been reached. At 416, JJs in the run are placed and JJs from other runs are moved (as needed) based on the solution found.

Figure 5:
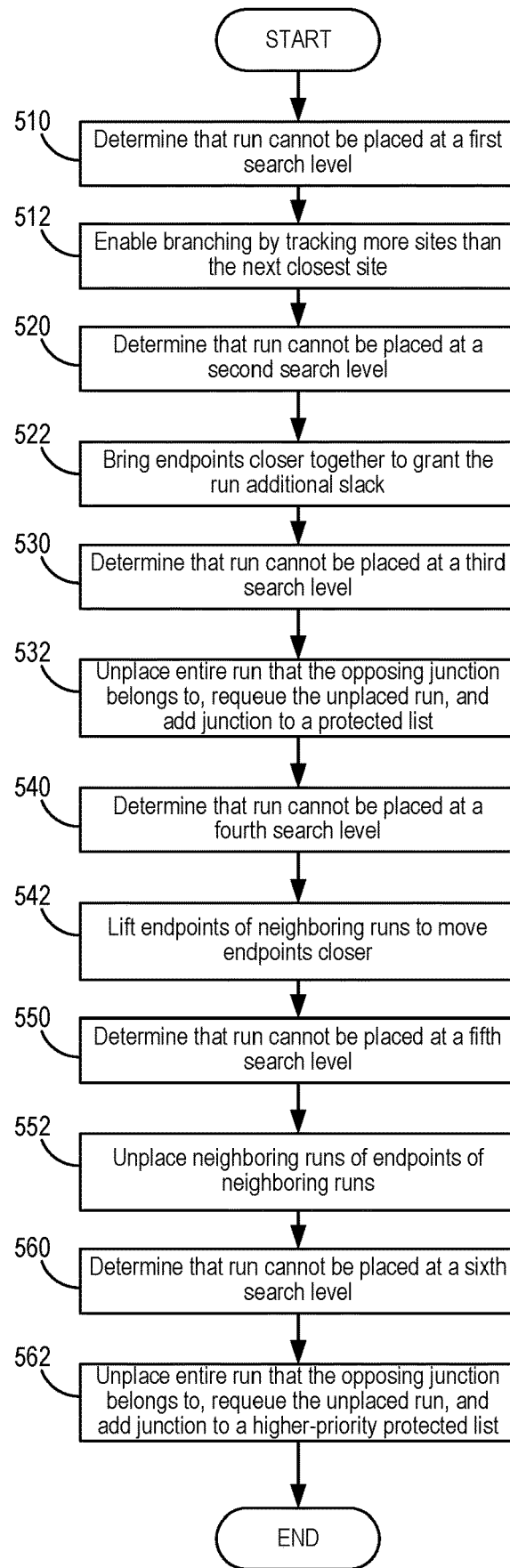
FIG. 5 illustrates a method of using successive search levels to determine arrangements of Josephson junctions for inductive wiring runs according to an embodiment.

FIG. 5 illustrates a method of using successive search levels to determine arrangements of Josephson junctions for inductive wiring runs. At each successive search level, more resource-intensive strategies are employed to find a successful placement solution that may have not been possible at a previous search level. In order to maximize performance and efficiency, the system attempts to place each of the inductive wiring runs in the queue of runs at lower search levels before attempting the higher levels, which may be more costly, for example.

At 510, the processors determine that a run cannot be placed at a first search level that includes the site free-up procedure described in FIG. 4. This can occur because a simple, greedy algorithm can sometimes give a false negative result when attempting to route a path from the start point of a run through the placement sites closest to the end point of the run.

At 512, the processors can enable branching by tracking more sites than the next closest site. For example, the processors can track three or four of the closest sites from the current junction site to the end point of the run. This may allow the reachability algorithm, mentioned above, to explore more possible routes to the end point, for example.

At 520, the processors determine that the run cannot be placed at the second search level, which includes branching. This can occur, for example, when a run is routing through a very congested area (e.g., one where most of the junction placement sites are already reserved by previously placed runs).

At 522, the processors can bring the start and/or end points of the run closer together to grant the run additional slack. For example, if the start or end point of the run is a splitter Josephson junction, the splitter can be moved to closer placement site that reduces the total length of the run. This results in more potentially usable placement sites for the Josephson junctions of the run itself.

At 530, the processors determine that the run cannot be placed at the third search level, which includes bringing the endpoints closer together. At this point, there is possibly an immovable Josephson junction belonging to another run in the way.

At 532, the processors can unplace (aka bulldoze) an entire run that the opposing junction belongs to. The bulldozed run is then readded to the queue of runs, and the Josephson junction assigned to the current run is added to a protected list so that later runs in the queue do not replace it.

At 540, the processors determine that the run cannot be placed at the fourth search level, which includes unplacing previous runs. This may occur when there is a protected Josephson junction in the way of the current run. At 542, the processors can lift endpoints (e.g., splitter legs) of neighboring runs to move the start and end points of the current run closer together.

At 550, the processors determine that the run cannot be placed at the fifth search level, which includes lifting endpoints of the immediate neighboring runs. At 552, the processors can lift even more splitter legs by unplacing not only the immediate neighboring runs, but also any runs which share endpoints with the immediate neighboring runs. For example, the current run may start at a splitter that is connected to two other splitters. At the sixth search level, these two other splitters and their associated runs are removed and replaced. This results in the runs affecting the current run being moved closer together to allow additional slack for the current run and provide more Josephson junction placement sites to be in range (e.g., to meet timing and inductance requirements).

At 560, the processors determine that the run cannot be placed at the sixth search level, which includes unplacing neighboring runs. This may occur when there is a protected junction at a site that is required for the current run. At 562, the processors can reclaim bulldozed junctions by unplacing the entire run that the opposing, protected junction belongs to, requeuing the unplaced run, and adding the junction for the current run to a higher priority protected list.

In some embodiments, if the sixth search level fails to produce a possible placement solution for the run, there may be a certain junction site that is required for more than one run. In this situation, additional junctions may be added to the runs before they are readded to the queue.

Example Implementations

Figure 6A:
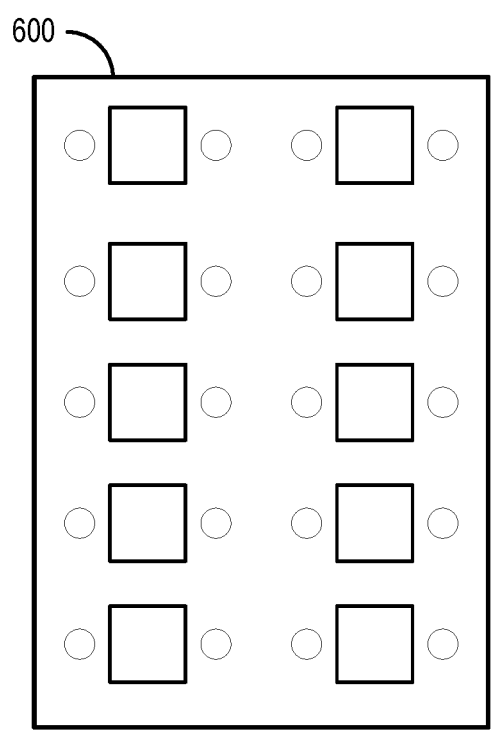
FIG. 6A illustrates an example superconducting circuit layout including an array of free Josephson junction placement sites according to an embodiment.
Figure 6B:
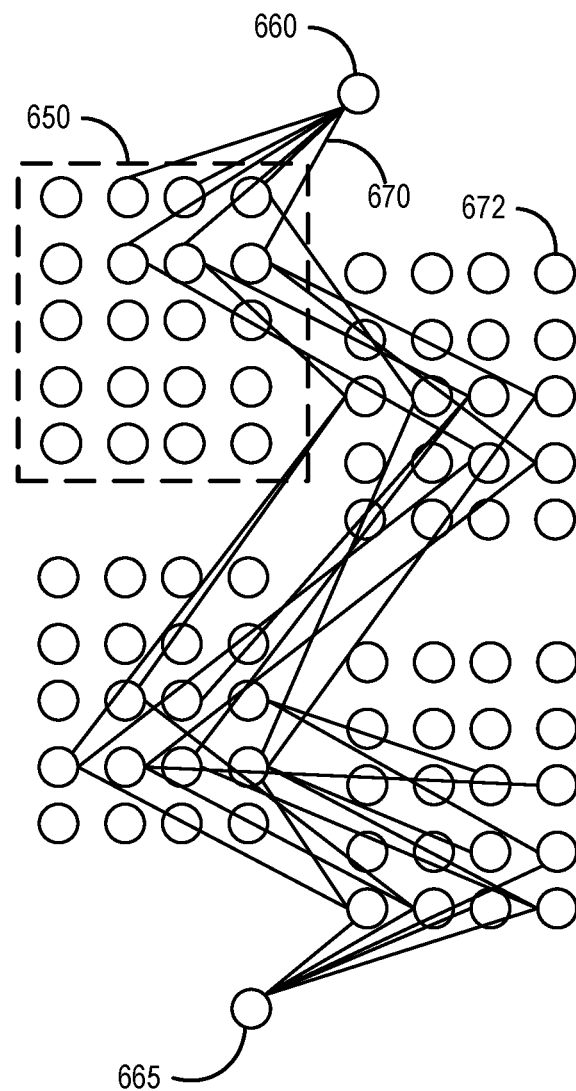
FIG. 6B illustrates an example graph representation used to determine placement of four Josephson junctions on the example superconducting circuit layout according to an embodiment.

FIG. 6A illustrates an example superconducting circuit layout 600 including an array of free Josephson junction placement sites according to an embodiment. FIG. 6B illustrates an example graph representation used to determine placement of four Josephson junctions on the example superconducting circuit layout 600 according to an embodiment. As illustrated, each of the available placement sites is represented by a graph node for each Josephson junction. In this example, the four 4×5 arrays 650 illustrate graph nodes 672 representing combinations of Josephson junctions and placement sites on the superconducting circuit layout 600. Nodes 660 and 665 represent the start and end of the wire run. Each of the edges 670 is a potential path from the start point 660 to the end point 665 searched by the graph search algorithm in order to find a series of JJ placements that represent the minimum cost route.

Figure 7A:
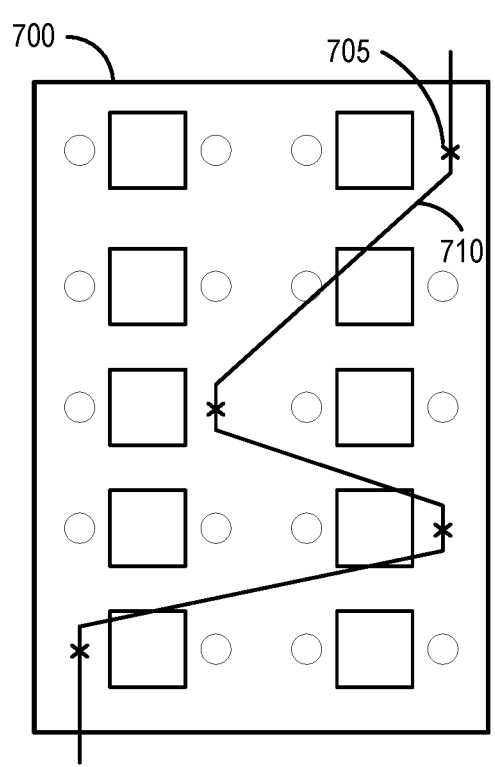
FIG. 7A illustrates an example superconducting circuit layout with Josephson junction placement determined according to an embodiment.
Figure 7B:
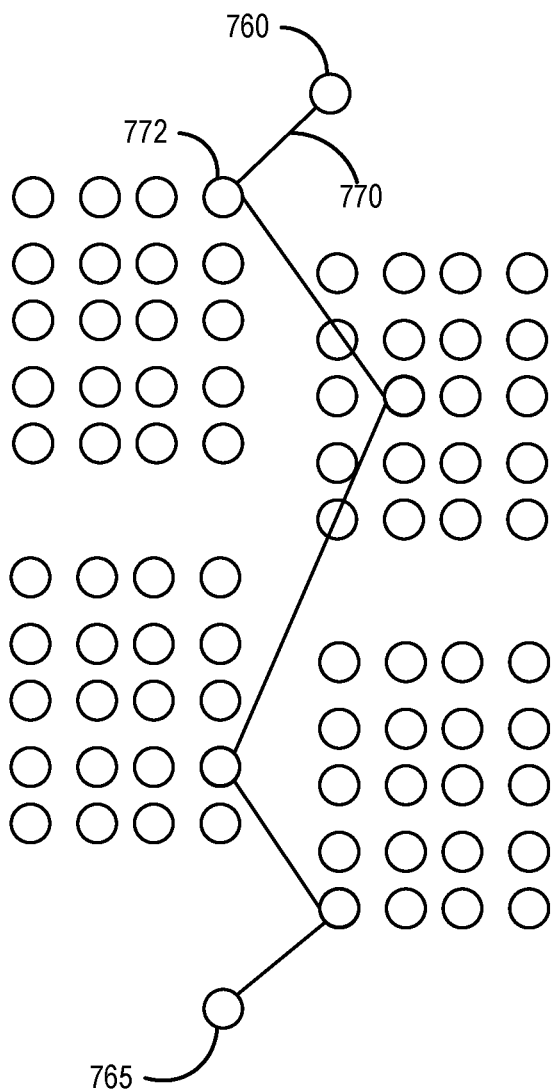
FIG. 7B illustrates an example graph representation of sites chosen for the placement of four Josephson junctions on the example superconducting circuit layout according to an embodiment.

FIG. 7A illustrates an example superconducting circuit layout 700 with Josephson junction placement determined according to an embodiment. In this example, the graph search algorithm applied to the edges and nodes of FIG. 6B has determined the minimum cost route and the corresponding Josephson junctions 705 for the inductive wiring run 710. FIG. 7B illustrates an example graph representation of sites that the graph search algorithm has chosen for the placement of four Josephson junctions 705 on the example superconducting circuit layout 700 according to an embodiment. The selected edges 770 from the graph search algorithm represent the minimum cost route from the start point 760 to the end point 765 connecting the nodes 772. The nodes 772 along the route correspond to the locations of each of the four JJs 705 placed on the superconducting circuit layout 700 for the inductive wiring run 710.

Figure 8:
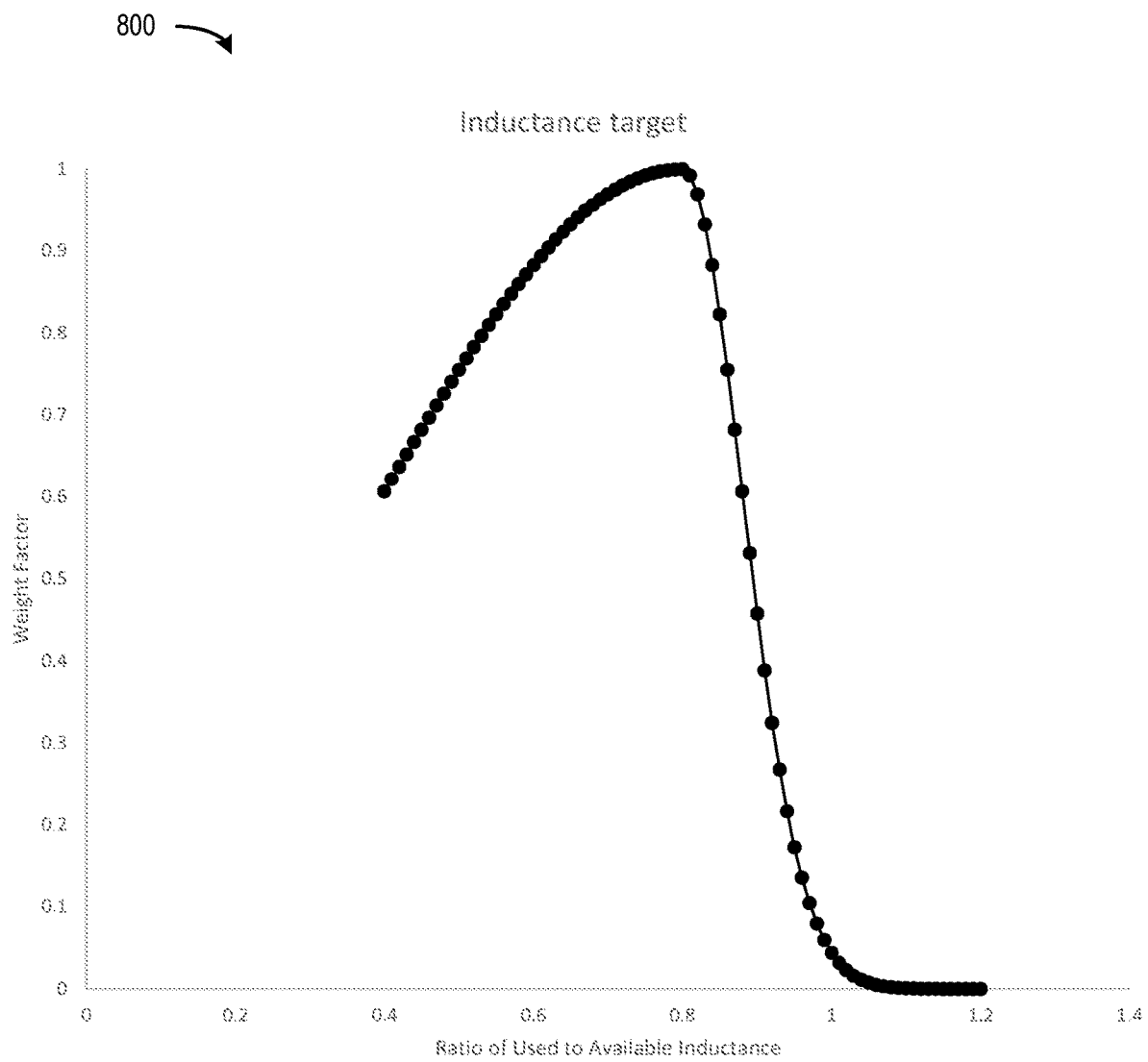
FIG. 8 illustrates a graph comparing a ratio of used to available inductance in a segment of an inductive wiring run to a weight factor used to determine Josephson junction placement according to an embodiment.

FIG. 8 illustrates a graph 800 of a ratio of used to available inductance in a segment of an inductive wiring run along the x-axis and a weight factor in the graph search algorithm to determine Josephson junction placement along the y-axis. The graph search algorithm attempts to find a lowest cost path through the graph node representation of the Josephson junction placement sites. In some examples, the cost of an edge is based on the inductance of the wire between its end points. Graph 800 corresponds to the inverse of the costs as discussed below. Various embodiments of the present disclosure may operate to maximize the probability of successful inductor wiring between JJs for each of the inductive wiring runs to be placed on the superconducting circuit layout.

As illustrated, the x-axis is a ratio of used to available inductance (e.g., an inductance buffer) and the y-axis of the graph 800 represents a weight factor. For example, when the target inductance value is approximately 0.8, or 80%, of the available inductance of a wire, wires with a length corresponding to this inductance value have a weight factor of 1. In other words, there is no penalty to their edge costs in the graph search algorithm (e.g., weight factor has an inverse relation to cost). On the other hand, wires which only use 40% of their available inductances receive a weight factor of 0.6, which imposes a higher cost on their edges in the graph search algorithm. Similarly, wires which use 100% of their available inductances receive a weight factor below 0.1, which imposes an even higher cost (e.g., there is no buffer on the inductance).

In one embodiment, the target inductance value of 80% is below an optimal or available inductance value for the wires. By targeting an inductance value below the maximum available inductance, the graph search algorithm favors Josephson junction placement sites that are not necessarily at the maximum length of a wire segment for a run. As a result, there are more possibilities for moving junctions as necessary to accommodate other runs (e.g., runs in the queue of runs to be placed after a particular run) since the buffer (or slack) allows a site further away, and requiring a longer wire, to be used.

Example Computer System

Figure 9:
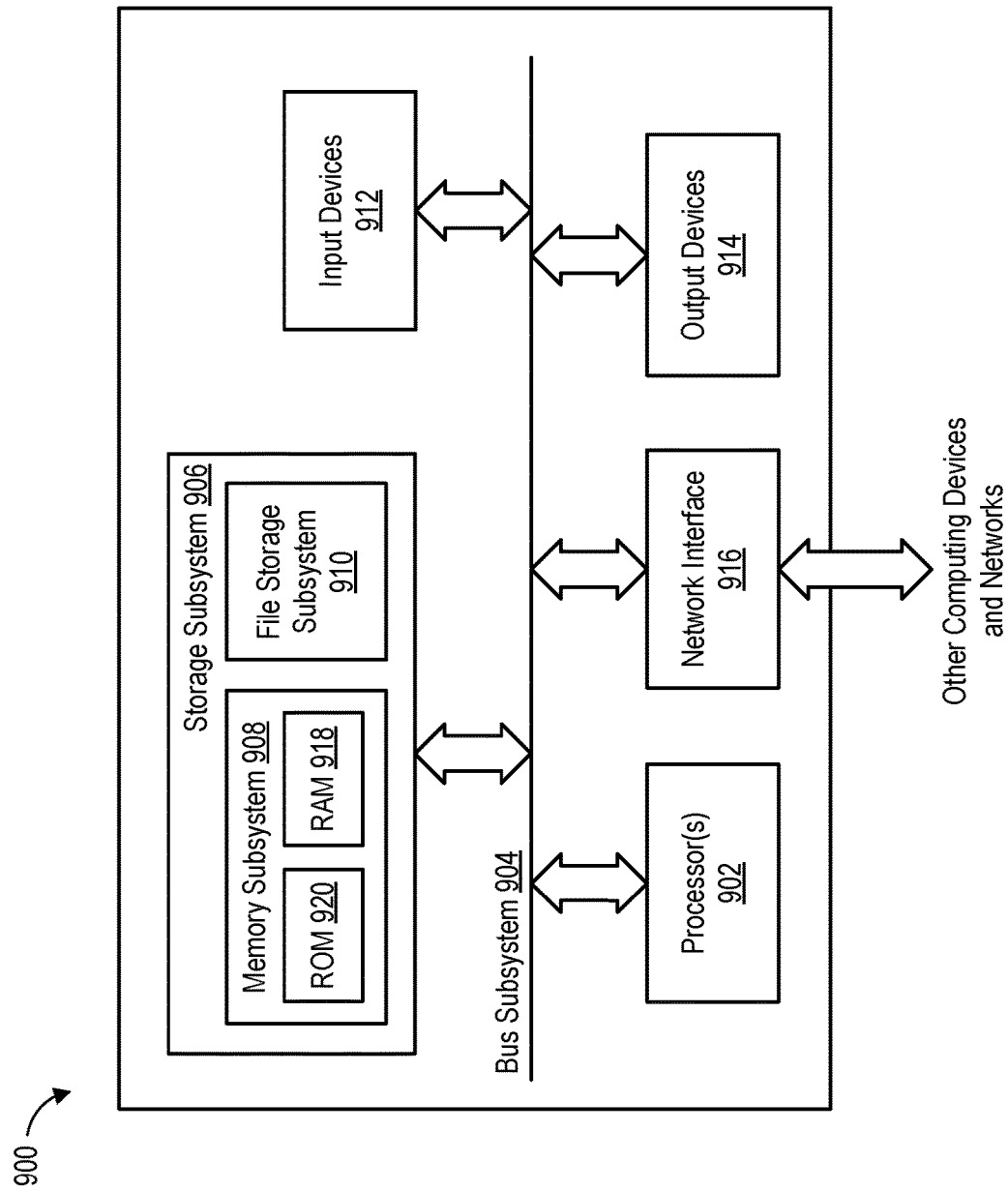
FIG. 9 illustrates a simplified block diagram of an example computer system according to an embodiment.

FIG. 9 illustrates a simplified block diagram of an example computer system 900, which can be used to implement the techniques described in the foregoing disclosure. As shown, computer system 900 includes one or more processors 902 that communicate with a number of peripheral devices via a bus subsystem 904. These peripheral devices may include a storage subsystem 906 (e.g., comprising a memory subsystem 908 and a file storage subsystem 910) and a network interface subsystem 916. Some computer systems may further include user interface input devices 912 and/or user interface output devices 914.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., Ethernet, a Wi-Fi and/or cellular adapter, a modem (telephone, satellite, cable, ISDN, etc.), digital subscriber line (DSL) units, and/or the like.

Storage subsystem 906 includes a memory subsystem 908 and a file/disk storage subsystem 910. Subsystems 908 and 910 as well as other memories described herein are examples of non-transitory computer-readable storage media that can store executable program code and/or data that provide the functionality of embodiments of the present disclosure.

Memory subsystem 908 includes a number of memories including a main random-access memory (RAM) 918 for storage of instructions and data during program execution and a read-only memory (ROM) 920 in which fixed instructions are stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than computer system 900 are possible.

Further Example Embodiments

In various embodiments, the present disclosure includes systems, methods, and apparatuses for the automatic placement of superconducting devices. The following examples may be used alone or in various combinations.

In one embodiment, the present disclosure includes a system comprising: one or more processors; and a non-transitory computer readable storage medium having stored thereon program code executable by the one or more processors, the program code causing the one or more processors to: on a superconducting circuit layout having a plurality of discrete Josephson junction placement sites, determine an arrangement of a series of Josephson junctions between a start point and an end point of an inductive wiring run by: determining costs of placing each Josephson junction of the series of Josephson junctions at the plurality of discrete Josephson junction placement sites between the start point and the end point of the inductive wiring run based at least on a comparison of a target inductance value to inductances of wires connecting to the Josephson junction; and selecting sites from the plurality of discrete Josephson junction placement sites to place each Josephson junction corresponding to the arrangement of the series of Josephson junctions with the least determined cost for the inductive wiring run.

In another embodiment, the present disclosure includes a method of Josephson junction arrangement on a superconducting circuit layout, the method comprising: on a superconducting circuit layout having a plurality of discrete Josephson junction placement sites, determine an arrangement of a series of Josephson junctions between a start point and an end point of an inductive wiring run by: determining costs of placing each Josephson junction of the series of Josephson junctions at the plurality of discrete Josephson junction placement sites between the start point and the end point of the inductive wiring run based at least on a comparison of a target inductance value to inductances of wires connecting to the Josephson junction; and selecting sites from the plurality of discrete Josephson junction placement sites to place each Josephson junction corresponding to the arrangement of the series of Josephson junctions with the least determined cost for the inductive wiring run.

In another embodiment, the present disclosure includes a non-transitory computer readable storage medium having stored thereon program code executable by one or more processors, the program code causing the one or more processors to: on a superconducting circuit layout having a plurality of discrete Josephson junction placement sites, determine an arrangement of a series of Josephson junctions between a start point and an end point of an inductive wiring run by: determining costs of placing each Josephson junction of the series of Josephson junctions at the plurality of discrete Josephson junction placement sites between the start point and the end point of the inductive wiring run based at least on a comparison of a target inductance value to inductances of wires connecting to the Josephson junction; and selecting sites from the plurality of discrete Josephson junction placement sites to place each Josephson junction corresponding to the arrangement of the series of Josephson junctions with the least determined cost for the inductive wiring run.

In one embodiment, the costs are determined at least by: representing combinations of the series of Josephson junctions and the discrete Josephson junction placement sites as graph nodes; determining a plurality of valid edges between the graph nodes; and for at least some combinations of the plurality of valid edges, determining a deviation of the inductances of the inductive wiring run from an optimal inductance for the inductive wiring run.

In one embodiment, the cost is further determined by whether the site is used by a previous inductive wiring run.

In one embodiment, the program code causes the one or more processors to determine a plurality of arrangements of series of Josephson junctions for a plurality of inductive wiring runs by: sorting, by one or more sorting criteria, a queue of the plurality of inductive wiring runs; determining a plurality of costs corresponding to different placements of the series of Josephson junctions for each of the plurality of inductive wiring runs in the queue; and selecting sites corresponding to the placement sites for the series of Josephson junctions having the lowest cost for each of the plurality of inductive wiring runs in the queue.

In one embodiment, the one or more sorting criteria include (1) prioritizing short runs with few options and (2) a count of the number of Josephson junctions associated with each inductive wiring run, sorted in descending order.

In one embodiment, the sites corresponding to the placement sites for the series of Josephson junctions having the lowest cost for each of the plurality of inductive wiring runs in the queue are selected using a graph search algorithm.

In one embodiment, upon determining that there are no available Joseph junction placement sites to satisfy a predefined minimum inductance and a predefined maximum inductance of the inductive wiring run, assigning a previously-placed Josephson junction from a previous inductive wiring run of the plurality of inductive wiring runs to an alternate placement site to accommodate both the inductive wiring run and the previous inductive wiring run.

In one embodiment, upon determining that there are no available Joseph junction placement sites to satisfy the predefined minimum inductance and the predefined maximum inductance of the inductive wiring run, adjusting the graph search algorithm to track sites more than a next closest site.

In one embodiment, upon determining that there are no available Joseph junction placement sites to satisfy the predefined minimum inductance and the predefined maximum inductance of the inductive wiring run, moving either or both of the start point and the end point of the inductive wiring run.

In one embodiment, upon determining that there are no available Joseph junction placement sites to satisfy the predefined minimum inductance and the predefined maximum inductance of the inductive wiring run, making a placement site available by: removing a previous inductive wiring run that includes the Josephson junction at the placement site; adding the previous inductive wiring run to the queue; and including the Josephson junction at the placement site on a protected list.

In one embodiment, upon determining that there are no available Joseph junction placement sites to satisfy the predefined minimum inductance and the predefined maximum inductance of the inductive wiring run, moving either or both of the start point and the end point of any inductive wiring runs neighboring the inductive wiring run.

In one embodiment, upon determining that there are no available Joseph junction placement sites to satisfy the predefined minimum inductance and the predefined maximum inductance of the inductive wiring run, making a placement site available by: removing one or more inductive wiring runs sharing endpoints with one or more inductive wiring runs neighboring the inductive wiring run.

In one embodiment, upon determining that there are no available Joseph junction placement sites to satisfy the predefined minimum inductance and the predefined maximum inductance of the inductive wiring run, making a placement site available by: removing a previous inductive wiring run that includes the Josephson junction at the placement site, regardless of its status on a protected list; adding the previous inductive wiring run to the queue; and including the Josephson junction at the placement site on a higher priority protected list.

In one embodiment, the plurality of discrete Josephson junction placement sites are arranged in one or more two-dimensional arrays.

In one embodiment, the target inductance value is below an optimal inductance value for the wires connecting to the Josephson junction.

The above description illustrates various embodiments of the present disclosure along with examples of how aspects of the particular embodiments may be implemented. The above examples should not be deemed to be the only embodiments and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A system comprising:
one or more processors; and
a non-transitory computer readable storage medium having stored thereon program code executable by the one or more processors, the program code causing the one or more processors to:
on a superconducting circuit layout having a plurality of discrete Josephson junction placement sites, determine an arrangement of a series of Josephson junctions between a start point and an end point of an inductive wiring run by:
determining costs of placing each Josephson junction of the series of Josephson junctions at the plurality of discrete Josephson junction placement sites between the start point and the end point of the inductive wiring run based at least on a comparison of a target inductance value to inductances of wires connecting to each Josephson junction of the series of Josephson junctions; and
selecting sites from the plurality of discrete Josephson junction placement sites to place each Josephson junction corresponding to the arrangement of the series of Josephson junctions with the least determined cost for the inductive wiring run.

2. The system of claim 1, wherein the costs are determined at least by:
representing combinations of the series of Josephson junctions and the discrete Josephson junction placement sites as graph nodes;
determining a plurality of valid edges between the graph nodes; and
for at least some combinations of the plurality of valid edges, determining a deviation of the inductances of the inductive wiring run from an optimal inductance for the inductive wiring run.

3. The system of claim 2, wherein the cost is further determined by whether the site is used by a previous inductive wiring run.

4. The system of claim 1, wherein the program code causes the one or more processors to determine a plurality of arrangements of series of Josephson junctions for a plurality of inductive wiring runs by:
sorting, by one or more sorting criteria, a queue of the plurality of inductive wiring runs;
determining a plurality of costs corresponding to different placements of the series of Josephson junctions for each of the plurality of inductive wiring runs in the queue; and
selecting sites corresponding to the placement sites for the series of Josephson junctions having the lowest cost for each of the plurality of inductive wiring runs in the queue.

5. The system of claim 4, wherein the one or more sorting criteria include (1) prioritizing short runs with few options and (2) a count of the number of Josephson junctions associated with each inductive wiring run, sorted in descending order.

6. The system of claim 4, wherein the sites corresponding to the placement sites for the series of Josephson junctions having the lowest cost for each of the plurality of inductive wiring runs in the queue are selected using a graph search algorithm.

7. The system of claim 6, wherein upon determining that there are no available Josephson junction placement sites to satisfy a predefined minimum inductance and a predefined maximum inductance of the inductive wiring run, assigning a previously-placed Josephson junction from a previous inductive wiring run of the plurality of inductive wiring runs to an alternate placement site to accommodate both the inductive wiring run and the previous inductive wiring run.

8. The system of claim 7, wherein upon determining that there are no available Joseph junction placement sites to satisfy the predefined minimum inductance and the predefined maximum inductance of the inductive wiring run, adjusting the graph search algorithm to track sites more than a next closest site.

9. The system of claim 7, wherein upon determining that there are no available Joseph junction placement sites to satisfy the predefined minimum inductance and the predefined maximum inductance of the inductive wiring run, moving either or both of the start point and the end point of the inductive wiring run.

10. The system of claim 7, wherein upon determining that there are no available Joseph junction placement sites to satisfy the predefined minimum inductance and the predefined maximum inductance of the inductive wiring run, making a placement site available by:
removing a previous inductive wiring run that includes the Josephson junction at the placement site;
adding the previous inductive wiring run to the queue; and
including the Josephson junction at the placement site on a protected list.

11. The system of claim 7, wherein upon determining that there are no available Joseph junction placement sites to satisfy the predefined minimum inductance and the predefined maximum inductance of the inductive wiring run, moving either or both of the start point and the end point of any inductive wiring runs neighboring the inductive wiring run.

12. The system of claim 7, wherein upon determining that there are no available Joseph junction placement sites to satisfy the predefined minimum inductance and the predefined maximum inductance of the inductive wiring run, making a placement site available by:
removing one or more inductive wiring runs sharing endpoints with one or more inductive wiring runs neighboring the inductive wiring run.

13. The system of claim 7, wherein upon determining that there are no available Joseph junction placement sites to satisfy the predefined minimum inductance and the predefined maximum inductance of the inductive wiring run, making a placement site available by:
removing a previous inductive wiring run that includes the Josephson junction at the placement site, regardless of its status on a protected list;
adding the previous inductive wiring run to the queue; and
including the Josephson junction at the placement site on a higher priority protected list.

14. The system of claim 1, wherein the plurality of discrete Josephson junction placement sites are arranged in one or more two-dimensional arrays.

15. The system of claim 1, wherein the target inductance value is below an optimal inductance value for the wires connecting to the each Josephson junction of the series of Josephson junctions.

16. A method of Josephson junction arrangement on a superconducting circuit layout, the method comprising:
- on a superconducting circuit layout having a plurality of discrete Josephson junction placement sites, determine an arrangement of a series of Josephson junctions between a start point and an end point of an inductive wiring run by:
  - determining costs of placing each Josephson junction of the series of Josephson junctions at the plurality of discrete Josephson junction placement sites between the start point and the end point of the inductive wiring run based at least on a comparison of a target inductance value to inductances of wires connecting to each Josephson junction of the series of Josephson junctions; and
  - selecting sites from the plurality of discrete Josephson junction placement sites to place each Josephson junction corresponding to the arrangement of the series of Josephson junctions with the least determined cost for the inductive wiring run.

17. The method of claim 16, wherein the costs are determined at least by:
- representing combinations of the series of Josephson junctions and the discrete Josephson junction placement sites as graph nodes;
- determining a plurality of valid edges between the graph nodes; and
- for at least some combinations of the plurality of valid edges, determining a deviation of the inductances of the inductive wiring run from an optimal inductance for the inductive wiring run.

18. The method of claim 17, wherein the cost is further determined by whether the site is used by a previous inductive wiring run.

19. The method of claim 16, further comprising:
- determining a plurality of arrangements of series of Josephson junctions for a plurality of inductive wiring runs by:
  - sorting, by one or more sorting criteria, a queue of the plurality of inductive wiring runs;
  - determining a plurality of costs corresponding to different placements of the series of Josephson junctions for each of the plurality of inductive wiring runs in the queue; and
  - selecting sites corresponding to the placement sites for the series of Josephson junctions having the lowest cost for each of the plurality of inductive wiring runs in the queue.

20. A non-transitory computer readable storage medium having stored thereon program code executable by one or more processors, the program code causing the one or more processors to:
- on a superconducting circuit layout having a plurality of discrete Josephson junction placement sites, determine an arrangement of a series of Josephson junctions between a start point and an end point of an inductive wiring run by:
  - determining costs of placing each Josephson junction of the series of Josephson junctions at the plurality of discrete Josephson junction placement sites between the start point and the end point of the inductive wiring run based at least on a comparison of a target inductance value to inductances of wires connecting to he each Josephson junction of the series of Josephson junctions; and
  - selecting sites from the plurality of discrete Josephson junction placement sites to place each Josephson junction corresponding to the arrangement of the series of Josephson junctions with the least determined cost for the inductive wiring run.

* * * * *